United States Patent
Washburn et al.

[11] Patent Number: 6,048,311
[45] Date of Patent: Apr. 11, 2000

[54] METHOD AND APPARATUS FOR ULTRASOUND IMAGING USING ADAPTIVE GRAY MAPPING

[76] Inventors: Michael J. Washburn, 12920 W. Graham St., New Berlin, Wis. 53151; William Thomas Hatfield, 1305 Keyes Ave., Schenectady, N.Y. 12309; Susan Thayer Mahan, 127 S. Lake Ave., Apt. 5, Albany, N.Y. 12208

[21] Appl. No.: 09/066,150

[22] Filed: Apr. 24, 1998

Related U.S. Application Data

[63] Continuation-in-part of application No. 08/852,772, May 7, 1997, Pat. No. 5,954,653.

[51] Int. Cl.⁷ ........................................................ A61B 8/00
[52] U.S. Cl. ............................................................. 600/443
[58] Field of Search .................................... 600/441, 443, 600/447, 458, 437

[56] References Cited

U.S. PATENT DOCUMENTS

| | | | |
|---|---|---|---|
| 5,042,077 | 8/1991 | Burke | 382/51 |
| 5,313,948 | 5/1994 | Murashita et al. | 128/662.02 |
| 5,456,255 | 10/1995 | Abe et al. | 128/660.07 |
| 5,469,849 | 11/1995 | Sasaki et al. | 128/660.07 |
| 5,529,070 | 6/1996 | Augustine et al. | 128/660.07 |
| 5,615,679 | 4/1997 | Ri et al. | 128/660.05 |
| 5,662,113 | 9/1997 | Liu | 600/443 |
| 5,682,895 | 11/1997 | Ishiguro | 128/660.04 |
| 5,706,816 | 1/1998 | Mochizuki et al. | 128/660.07 |
| 5,732,705 | 3/1998 | Yakoyama et al. | 600/443 |
| 5,793,883 | 8/1998 | Kim et al. | 600/443 |

*Primary Examiner*—Francis J. Jaworski
*Attorney, Agent, or Firm*—Dennis M. Flaherty; Christian G. Cabou; Phyllis Y. Price

[57] ABSTRACT

A method and an apparatus for improving the contrast of the displayed image data in a B-mode ultrasound imaging system. An adaptive gray mapping is based on the actual raw imaging data instead of assumptions about that raw data. The user specifies a region of the image (or the entire image) with a graphical region-of-interest (ROI) marker. When prompted by the user, a software program in the master controller analyzes the raw data within the ROI and constructs a new gray map based upon the analyzed data. This mapping can be created by transforming an old gray map or by generating a new gray map. This new gray map is then used by the ultrasound system during imaging. Optimum contrast is achieved by automatically adjusting the brightness and contrast levels of the image based on the values of the raw data.

26 Claims, 3 Drawing Sheets

METHOD AND APPARATUS FOR ULTRASOUND IMAGING USING ADAPTIVE GRAY MAPPING

RELATED PATENT APPLICATION

This application is a continuation-in-part application of U.S. patent application Ser. No. 08/852,772 filed on May 7, 1997 and now U.S. Pat. No. 5,954,653.

FIELD OF THE INVENTION

This invention generally relates to ultrasound imaging of the human anatomy for the purpose of medical diagnosis. In particular, the invention relates to methods and apparatus for B-mode imaging of human tissue by transmitting ultrasound waves into the tissue and then detecting ultrasound echoes reflected therefrom.

BACKGROUND OF THE INVENTION

Conventional ultrasound scanners are capable of operating in different imaging modes, such as B mode and color flow mode. In the B mode, two-dimensional images can be generated in which the brightness of display pixels is based on the value or amplitude of respective acoustic samples representing the returned echo signal.

In a conventional ultrasound imaging system (shown in FIG. 1), an ultrasound transducer array 2 is activated to transmit a series of multi-cycle (typically 4 to 8 cycles) tone bursts which are focused at the same transmit focal position with the same transmit characteristics. These tone bursts are fired at a pulse repetition frequency (PRF). The PRF is typically in the kilohertz range. A series of transmit firings focused at the same transmit focal position are referred to as a "packet". Each transmit beam propagates through the object being scanned and is reflected by ultrasound scatterers in the object.

After each transmit firing, the echo signals detected by the transducer array elements are fed to respective receive channels of the beamformer 4. The receive beamformer tracks echoes under the direction of a master controller (not shown in FIG. 1). The receive beamformer imparts the proper receive focus time delays to the received echo signal and sums them to provide an echo signal which accurately indicates the total ultrasonic energy reflected from a succession of ranges corresponding to a particular transmit focal position. The beamformer also transforms the RF signal into its I/Q components by means of Hilbert bandpass filtering. The I/Q components are then summed in a receive summer (not shown) for each transmit firing. Hilbert bandpass filtering can alternatively be performed after beam summation.

The output of the beamformer 4 is shifted in frequency by a demodulator 6. One way of achieving this is to multiply the input signal by a complex sinusoidal $e^{i2\pi f_d dt}$, where $f_d$ is the frequency shift required. The downshifted I/Q components are then sent to a B-mode processor 8, which incorporates an envelope detector 10 for forming the envelope of the beam-summed receive signal by computing the quantity $(I^2+Q^2)^{1/2}$. The envelope of the signal undergoes some additional B-mode processing, such as logarithmic compression (block 12 in FIG. 1), to form display data which is output to the scan converter 14.

In general, the display data is converted by the scan converter 14 into X-Y format for video display. The scan-converted frames are passed to a video processor 16, which maps the video data to a gray scale or mapping for video display. The gray scale image frames are then sent to the video monitor 18 for display.

The images displayed by the video monitor 18 are produced from an image frame of data in which each datum indicates the intensity or brightness of a respective pixel in the display. An image frame may, e.g., comprise a 256×256 data array in which each intensity datum is an 8-bit binary number that indicates pixel brightness. The brightness of each pixel on the display monitor 18 is continuously refreshed by reading the value of its corresponding element in the data array in a well-known manner. Each pixel has an intensity value which is a function of the backscatter cross section of a respective sample volume in response to interrogating ultrasonic pulses and the gray map employed.

A conventional ultrasound imaging system typically employs a variety of gray maps, which are simple transfer functions of the raw acoustic sample data to display gray values. Multiple gray maps are supported so that different maps may be used depending on the raw data. For example, if a given application tends to generate mainly low-level raw data, then a gray map which dedicates more gray-scale values to low-level raw data values is desired since it improves the contrast across this region. Therefore, it is typical to default to a different gray map depending on the application. However, this is not always effective since the user can scan any anatomy in any application, raw data varies from patient to patient, and the raw data depends on other system settings such as dynamic range. Due to these factors, the gray maps tend to be conservative with respect to how many gray-scale values are dedicated to the anticipated primary data range. Thus, there is a need to improve the contrast of the displayed pixel data by providing a means for gray mapping which is not based on assumptions about the raw acoustic sample data.

SUMMARY OF THE INVENTION

The present invention is a method and an apparatus for improving the contrast of the displayed pixel data in a B-mode ultrasound imaging system. This is accomplished by providing an adaptive gray mapping which is based on the actual raw acoustic sample data instead of assumptions about that raw data. In accordance with the technique of the invention, the user specifies a region of the image (or the entire image) with a graphical region-of-interest (ROI) marker. When prompted by the user, a software program in the master controller analyzes the raw data within the ROI and constructs a new gray map based upon the analyzed raw data. Optimum contrast is achieved by automatically adjusting the brightness and contrast levels of the image based on the values of the raw data. This new gray map is then used by the ultrasound system during display of the images.

In accordance with the adaptive gray map generating algorithm of the invention, the contrast of the displayed image is automatically adjusted using a gray map which is defined in part based upon certain characteristics of a raw data histogram. Then the raw data is contrast adjusted by transforming each acoustic sample value into the corresponding gray-scale value established by the newly generated mapping. The acoustic sample values outside the new gray map input range are mapped to a minimum (0) or a maximum (255) gray-scale value. By thus increasing the contrast of the raw acoustic sample data of greatest interest, each image is mapped to the desired brightness and contrast range depending on the intended result.

In accordance with one preferred embodiment of the invention, a CPU processes the raw data of one or more image frames and organizes the processed raw data into a histogram. The CPU then determines the end points of the histogram by searching from each direction. The range of acoustic sample values between the end points is the map input range. The CPU then compresses (or expands) the existing gray map to fit the new map input range, e.g., the end points 0 and 255 of the gray-scale value range are correlated to the end points of the map input range. Each acoustic sample value is then assigned a gray-scale value in accordance with this newly generated gray map. The new gray map is then employed in the video processor.

The following is a variation on the basic algorithm. Rather than searching for the absolute end (first non-zero input bin) from each direction, the search from each end can continue until some percentage of raw data is found. If different criteria are used at the lower and higher ends, this enables clipping of, for example, the lowest 5% of raw data and the highest 0.3% of raw data.

In accordance with a further alternative, the end points of the histogram can be established by calculating the standard deviation of the data and finding the end points associated with a particular number of standard deviations.

In accordance with some preferred embodiments, the CPU transforms the old map into the new map using the end points of the new map input range. Alternatively, it is possible to generate an entirely new map between the end points of the new map input range. However, retaining the characteristics of the original map has the advantage of maintaining any subjective aesthetic user preference for the current map.

DETAILED DESCRIPTION OF THE PREFERRED EMBODIMENTS

Figure 1:
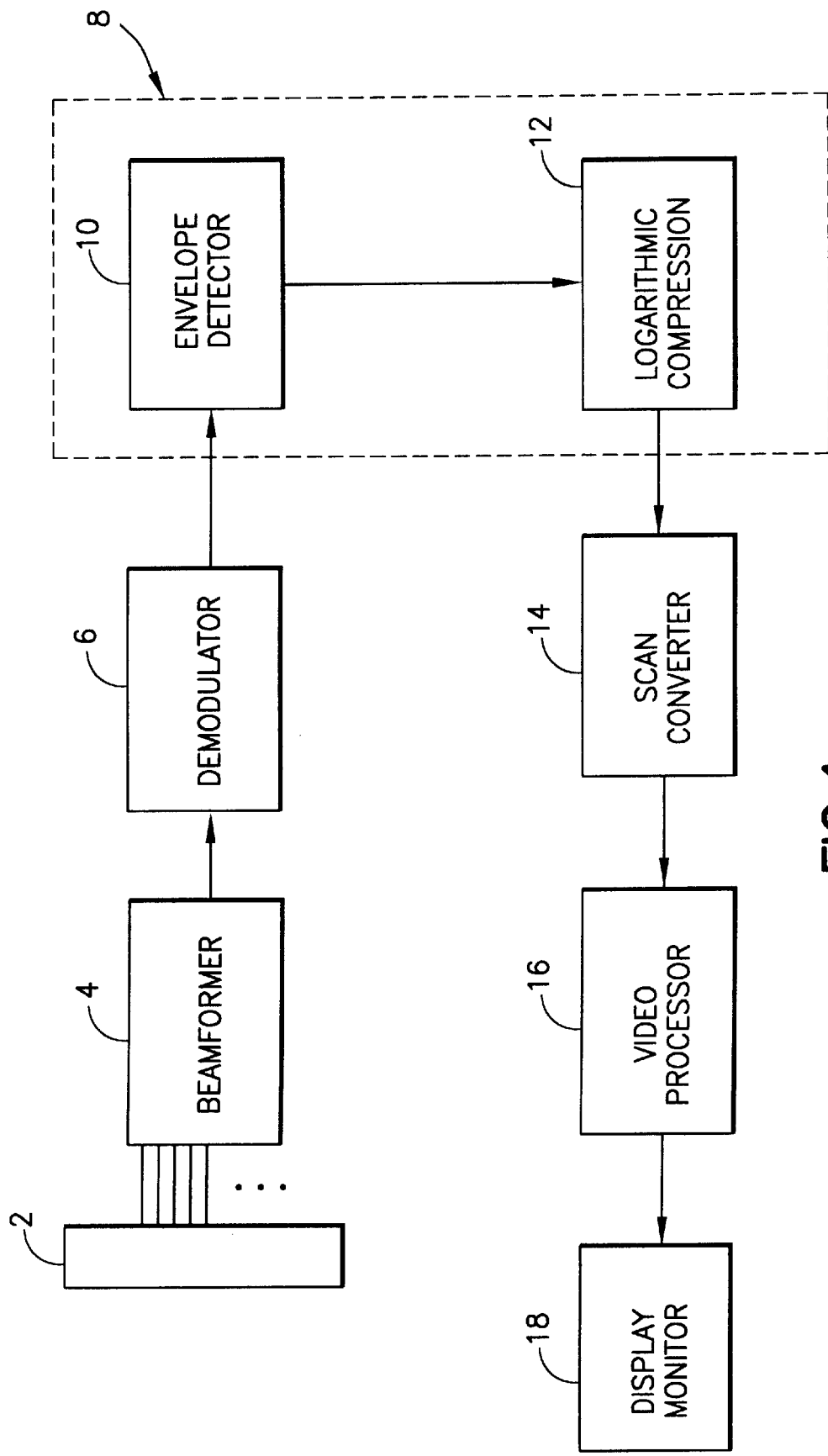
FIG. 1 is a block diagram showing the major functional subsystems within a real-time B-mode ultrasound imaging system.
Figure 2:
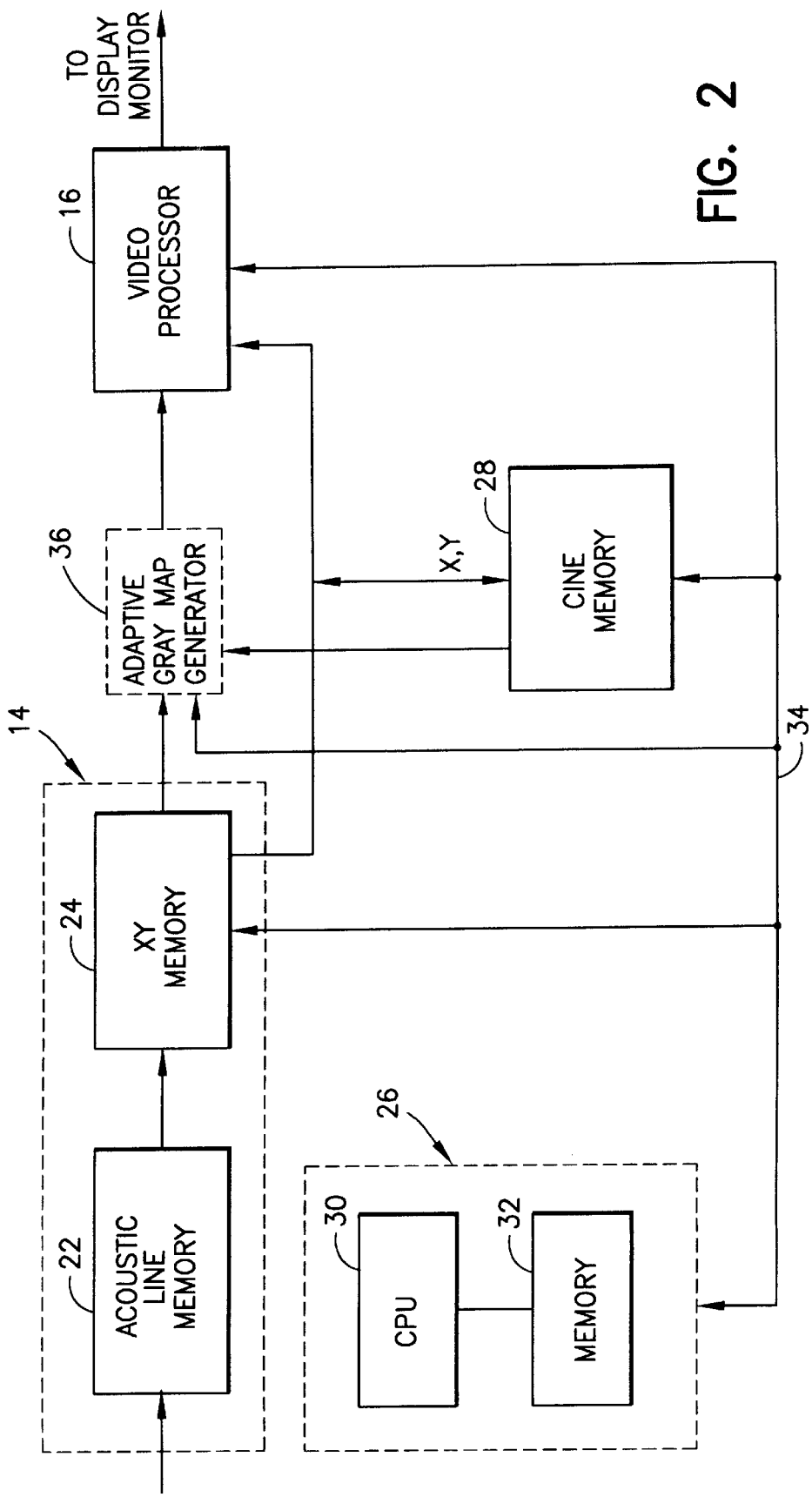
FIG. 2 is a block diagram showing the means for constructing a gray map in accordance with the present invention.

Referring to FIG. 2, system control is centered in a master controller or host computer 26, which accepts operator inputs through an operator interface (not shown) and in turn controls the various subsystems. The master controller 26 also generates the system timing and control signals. The master controller 26 comprises a central processing unit (CPU) 30 and a random access memory 32. The CPU 30 has read only memory incorporated therein for storing routines used in constructing gray maps based on acquired raw data.

The scan converter 14 comprises an acoustic line memory 22 and an X-Y memory 24. The B-mode intensity data stored in polar coordinate (R-θ) sector format in acoustic line memory 22 is transformed to appropriately scaled Cartesian coordinate pixel display data, which is stored in X-Y memory 24. The scan-converted frames are passed to video processor 16, which maps the data to a gray map for video display. The gray scale image frames are then sent to the video monitor for display.

Figure 3:
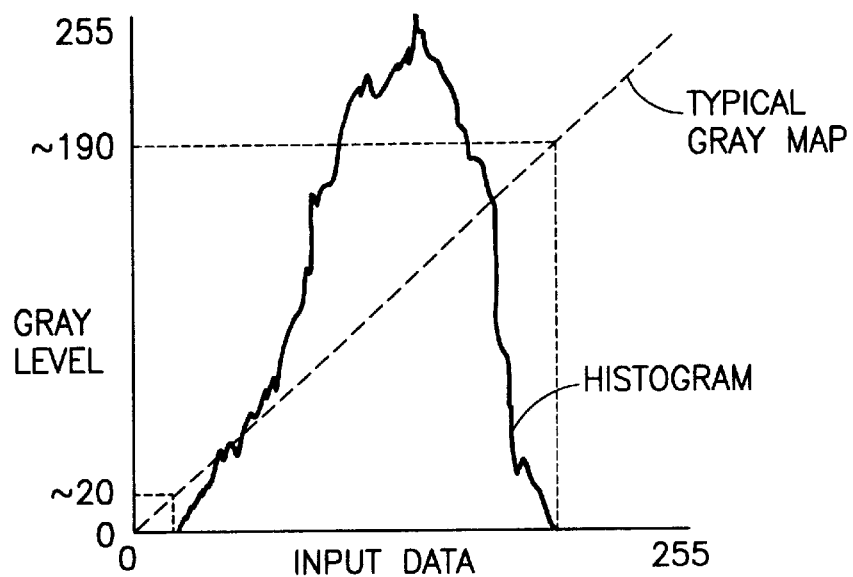
FIG. 3 is a graph showing a conventional gray map superimposed on a raw data histogram.

FIG. 3 shows a raw data histogram (indicated by the jagged solid line) with a typical gray map superimposed thereon (indicated by the dashed line). This typical gray map outputs a gray-scale value equal to the input value. Given the raw data and the gray map shown in FIG. 3, roughly 171 (20 through 190) gray-scale values out of 256 (0 to 255) are used. For this example, 67% of the gray-scale values are used.

In a conventional ultrasound system, successive frames of acoustic sample data are stored in cine memory 28 on a first-in, first-out basis. The cine memory is like a circular image buffer that runs in the background, continually capturing acoustic sample data that is displayed in real time to the user. When the user freezes the system, the user has the capability to view acoustic sample data previously captured in cine memory.

The CPU 26 controls the XY memory 24 and the cine memory 28 via the system control bus 34. In particular, the CPU 26 controls the flow of raw data from the XY memory 24 to the video processor 16 and to the cine memory 28, and from the cine memory to the video processor 16 and to the CPU 26 itself. The CPU also loads the gray maps into the video processor.

A conventional ultrasound imaging system collects image frames in cine memory 28 on a continuous basis. The cine memory 28 provides resident digital image storage for single image review and multiple image loop review and various control functions. The region of interest displayed during single-image cine replay is that used during the image's acquisition. The cine memory also acts as a buffer for transfer of images to digital archival devices (not shown) via the master controller 26.

The CPU 30 has random access memory for storing routines used in acquiring a raw data histogram, determining the end points of a new gray map input range, constructing a new gray map based on the end points of the new gray map input range, comparing the slope and gain of the new gray map to predetermined slope and gain limits, and if either limit is exceeded, reconstructing the new gray map to conform to the limit or limits.

In accordance with the preferred embodiments of the invention, the contrast of the ultrasound images is adjusted by the master controller 26 by creating a mapping of raw acoustic sample data into adjusted gray-scale values. First, the master controller 26 retrieves one or more image frames of raw data from the X-Y memory 24 or from the cine memory 28, storing that raw data in memory 32. The CPU 30 then compiles a histogram of the number of acoustic samples having an amplitude or value within each of a multiplicity of prescribed ranges or bins for the retrieved image frames of raw data.

Figure 4:
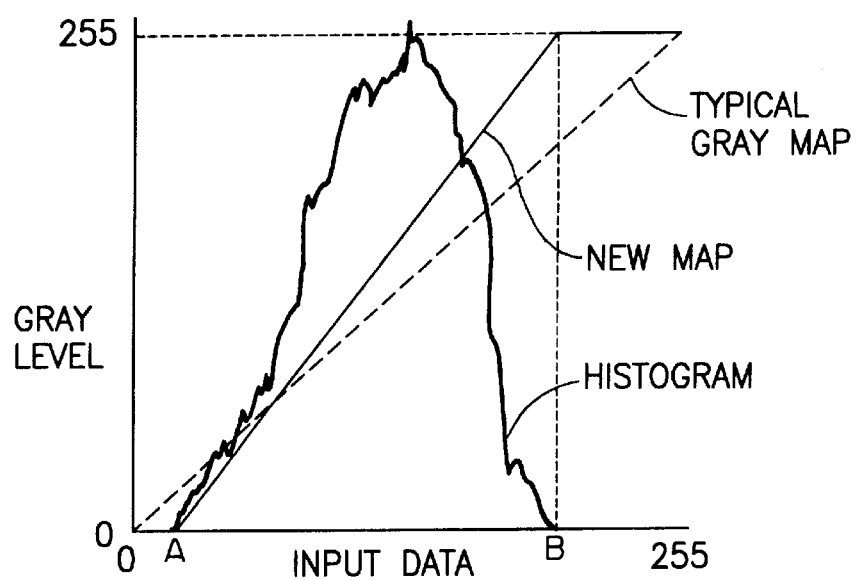
FIG. 4 is a graph showing a gray map in accordance with a preferred embodiment of the present invention superimposed on the same raw data histogram as that shown in FIG. 3.

At the same time, the CPU determines the maximum and minimum acoustic sample values in the image frames, which values are defined to correspond to the end points A and B (shown in FIG. 4) of the new map input range. A mapping is then created such that the range of acoustic sample values in the new map input range are correlated to a gray-scale value range from 0 to 255. The acoustic sample values outside the new gray map input range are mapped to a minimum (0) or a maximum (255) gray-scale value.

In accordance with the preferred embodiment of the invention, a new gray map is generated by transforming an old gray map comprising a table of input and output values. In the case where the old map is a linear function (indicated by the dashed line in FIG. 4), the new map will also be a linear function (indicated by the straight solid line in FIG. 4). Alternatively, if the old map is a nonlinear function, then the new map generated from the old map will also be a nonlinear function. For example, if the old gray map is a nonlinear function, a map transformation algorithm is used to compress (or expand) that nonlinear function to fit within the new map input range, e.g., the range from A to B in FIG. 4.

More specifically, each input value $x_{new}$ of the new map is processed to arrive at a corresponding new map output value $y_{new}$. The CPU 30 (see FIG. 2) performs the following steps.

If $x_{new}$<A, then $y_{new}$=0.

If $x_{new}$>B, then $Y_{new}$=255.

If $A \leq X_{new} \leq B$, then $y_{new}=y_{old}(I)$ where I is an index computed by the CPU based on the following equation:

$$\left(1 + \frac{256 - (B - A)}{B - A}\right)(x_{new} - A) = I$$

where the number 256 represents the old map input range, and (B−A) represents the new map input range. The new map output value $y_{new}$ is obtained by inputting the index I into the old gray map to obtain the corresponding old map output value. The latter value is then transferred into the new map. This process is repeated until output values for all of the new map input values between the end values A and B have been derived from the old map. Using this technique, the old map can be compressed (or expanded) to fit within the new map input range determined from the raw data histogram.

In accordance with another preferred embodiment, rather than searching for the absolute end (first non-zero input bin) from each direction, the search from each end can continue until some percentage of raw data is found. If different criteria are used at the lower and higher ends, this enables clipping of, for example, the lowest 5% of raw data and the highest 0.3% of raw data. This technique can be applied in the transformation of an old gray map (using the map transformation algorithm described above) or in the creation of a new gray map.

In accordance with further preferred embodiments of the invention, the end points can be established by calculating the standard deviation of the raw data and then finding the end points associated with a particular number of standard deviations. There is no restriction that the same criteria be used at each end.

As described above, a mapping can be created such that an input range of acoustic sample values are correlated to an expanded gray-scale value range, and acoustic sample values outside the new gray map input range are mapped to a minimum (0) or a maximum (255) gray-scale value. This mapping can be created by transforming an old gray map or by generating a new gray map.

Once the end points have been established, it is possible that the end points are so close to each other that the resulting contrast would make the image difficult to perceive. Accordingly, the gray map generating algorithm incorporates a subroutine for calculating the slope of the gray map and then comparing the calculated slope with a pre-stored slope limit. If the slope limit is exceeded, then the new gray map is reconstructed to have a slope equal to the limit, essentially moving the end points of the map input range apart to prevent too much contrast.

The new map may also display the center acoustic sample value of the histogram at a dramatically different gray-scale value than that produced by the old map. Therefore, the CPU is also programmed to manipulate the end points of the new map input range so that the resulting gain change is within a defined limit.

Although the preferred embodiments have been described with reference to gray map generation by a host computer, it will be appreciated by persons skilled in the art that, in the alternative, the new gray map could be generated by dedicated hardware. For example, FIG. 2 shows an adaptive gray map generator 36 (indicated by a dashed rectangle) which is capable of retrieving the raw acoustic sample data from the XY memory 24 and/or the cine memory 28, forming a raw data histogram, performing the various computations described hereinabove, generating a new gray map and then loading that new map into the video processor 16. Alternatively, the adaptive gray map generator 36 can retrieve the old gray map from the host computer 26 and then compress (or expand) that old map to fit the new gray map input range. This compressed (or expanded) version of the old map is then loaded into the video processor 16 and used to display the raw data as gray-scale data.

The foregoing preferred embodiments have been disclosed for the purpose of illustration. Variations and modifications of the basic concept of the invention will be readily apparent to those skilled in the art. All such variations and modifications are intended to be encompassed by the claims set forth hereinafter.

We claim:

1. A system for imaging ultrasound scatterers, comprising:

an ultrasound transducer array for transmitting ultrasound beams and detecting ultrasound echoes reflected at a multiplicity of sample volumes in a scan plane;

means coupled to said ultrasound transducer array for acquiring raw acoustic sample data derived from ultrasound echoes reflected from each scan plane;

first storage means for storing a respective image frame data set of raw acoustic sample data for each scan plane;

histogram means for organizing at least one of said image frame data sets into a histogram data set;

end-point determination means for determining first and second end points of a new map input range as a function of said histogram data set;

second storage means for storing an old map having output values corresponding to respective input values of an old map input range greater than said new map input range;

means for transforming said old map into a new map comprising output values corresponding to respective input values of said new map input range, said output values of said new map being derived from said output values of said old map;

means for inputting said new map to said second storage means;

means for applying the contents said second storage means to an image frame data set to form a mapped image frame data set;

a display monitor comprising a multiplicity of pixels; and means for displaying said mapped image frame data set by controlling intensity values of said pixels on said display monitor.

2. The system as defined in claim 1, wherein said old map comprises gray-scale values.

3. The system as defined in claim 1, wherein said end-point determination means comprise means for counting the lowest raw acoustic sample data values in said histogram data set until a predetermined percentage is attained, and means for determining a next highest acoustic sample data value not included in said predetermined percentage, said next highest acoustic sample data value being adopted as said first end point of said new map input range.

4. The system as defined in claim 1, wherein said end-point determination means comprise means for counting the highest raw acoustic sample data values in said histogram data set until a predetermined percentage is attained, and means for determining a next lowest acoustic sample data value not included in said predetermined percentage, said next lowest acoustic sample data value being adopted as said second end point of said new map input range.

5. The system as defined in claim 1, wherein said end-point determination means comprises means for determining maximum and minimum acoustic sample data values in said histogram data set.

6. The system as defined in claim 1, further comprising an adaptive gray map generator coupled to said first and second storage means, wherein said histogram means, said end-point determination means and said old map transforming means are incorporated in said adaptive gray map generator.

7. The system as defined in claim 1, further comprising:
means for comparing a slope of said new map with a predetermined slope limit; and
means for manipulating at least one of said first and second end points in response to said slope limit being exceeded.

8. The system as defined in claim 1, further comprising:
means for comparing a gain change of said new and old maps with a predetermined gain change limit; and
means for manipulating at least one of said first and second end points in response to said gain change limit being exceeded.

9. A system for imaging ultrasound scatterers, comprising:
an ultrasound transducer array for transmitting ultrasound beams and detecting ultrasound echoes reflected at a multiplicity of sample volumes in a scan plane;
means coupled to said ultrasound transducer array for acquiring raw acoustic sample data derived from ultrasound echoes reflected from each scan plane;
storage means for storing a respective image frame data set of raw acoustic sample data for each scan plane;
histogram means for organizing at least one of said image frame data sets of raw acoustic sample data into a histogram data set;
end-point determination means for determining first and second end points of a map input range as a function of said histogram data set;
means for constructing a gray-scale map comprising output gray-scale values corresponding to respective input values of said map input range;
means for applying said gray-scale map to an image frame data set to form a gray-scale mapped image frame data set;
a display monitor comprising a multiplicity of pixels; and
means for displaying said gray-scale mapped image frame data set by controlling the gray-scale intensity values of said pixels on said display monitor.

10. The system as defined in claim 9, wherein said end-point determination means comprise means for counting the lowest raw acoustic sample data values in said histogram data set until a predetermined percentage is attained, and means for determining a next highest acoustic sample data value not included in said predetermined percentage, said next highest acoustic sample data value being adopted as said first end point of said new map input range.

11. The system as defined in claim 9, wherein said end-point determination means comprise means for counting the highest raw acoustic sample data values in said histogram data set until a predetermined percentage is attained, and means for determining a next lowest acoustic sample data value not included in said predetermined percentage, said next lowest acoustic sample data value being adopted as said second end point of said new map input range.

12. The system as defined in claim 9, wherein said end-point determination means comprises means for determining maximum and minimum acoustic sample data values in said histogram data set.

13. A system for imaging ultrasound scatterers, comprising:
an ultrasound transducer array for transmitting ultrasound beams and detecting Ultrasound echoes reflected at a multiplicity of sample volumes in a scan plane;
means coupled to said ultrasound transducer array for acquiring raw acoustic sample data derived from ultrasound echoes reflected from each scan plane;
storage means for storing a respective image frame data set of raw acoustic sample data for each scan plane;
an adaptive gray map generator coupled to said storage means and to said map applying means, said adaptive gray map generator comprising
histogram means for organizing at least one of said image frame data sets into a histogram data set, end-point determination means for determining first and second end points of a map input range as a function of said histogram data set, and means for constructing a map comprising output values corresponding to respective input values of said map input range;
means for applying said map to an image frame data set to form a mapped image frame data set;
a display monitor comprising a multiplicity of pixels; and
means for displaying said mapped image frame data set by controlling the intensity values of said pixels on said display monitor.

14. A system for imaging ultrasound scatterers, comprising:
an ultrasound transducer array for transmitting ultrasound beams and detecting ultrasound echoes reflected at a multiplicity of sample volumes in a scan plane;
means coupled to said ultrasound transducer array for acquiring raw acoustic sample data derived from ultrasound echoes reflected from each scan plane,
storage means for storing a respective image frame data set of raw acoustic sample data for each scan plane;
histogram means for organizing at least one of said image frame data sets into a histogram data set;
end-point determination means for determining first and second end points of a map input range as a function of said histogram data set;
means for constructing a map comprising output values corresponding to respective input values of said map input range;
means for comparing a slope of said map with a predetermined slope limit;
means for manipulating at least one of said first and second end points to form a reconstructed map in response to said slope limit being exceeded;

means for applying said reconstructed map to an image frame data set to form a mapped image frame data set;

a display monitor comprising a multiplicity of pixels; and means for displaying said mapped image frame data set by controlling the intensity values of said pixels on said display monitor.

15. A method for imaging ultrasound scatterers, comprising the following steps:

transmitting ultrasound beams in a scan plane;

detecting ultrasound echoes reflected at a multiplicity of sample volumes in said scan plane;

acquiring raw acoustic sample data derived from ultrasound echoes reflected from said scan plane;

storing an image frame data set of raw acoustic sample data for said scan plane;

organizing said raw acoustic sample data of said image frame data set into a histogram data set;

determining a first end point of a new map input range as a function of said histogram data set;

determining a second end point of said new map input range as a function of said histogram data set;

storing an old map having output values corresponding to respective input values of an old map input range greater than said new map input range;

transforming said old map into a new map comprising output values corresponding to respective input values of said new map input range, said output values of said new map being derived from said output values of said old map;

applying said new map to an image frame data set to form a mapped image frame data set; and displaying said mapped image frame data set.

16. The method as defined in claim 15, wherein said first end-point determining step comprises the steps of counting the lowest raw acoustic sample data values in said histogram data set until a predetermined percentage is attained, and determining a next highest acoustic sample data value not included in said predetermined percentage, said next highest acoustic sample data value being adopted as said first end point of said new map input range.

17. The method as defined in claim 15, wherein said second end-point determining step comprises the steps of counting the highest raw acoustic sample data values in said histogram data set until a predetermined percentage is attained, and determining a next lowest acoustic sample data value not included in said predetermined percentage, said next lowest acoustic sample data value being adopted as said second end point of said new map input range.

18. The method as defined in claim 15, further comprising the steps of:

comparing a slope of said new map with a predetermined slope limit; and manipulating at least one of said first and second end points in response to said slope limit being exceeded.

19. The method as defined in claim 15, further comprising the steps of:

comparing a gain change of said new and old maps with a predetermined gain change limit; and manipulating at least one of said first and second end points in response to said gain change limit being exceeded.

20. A method for imaging ultrasound scatterers, comprising the following steps:

transmitting ultrasound beams in a scan plane;

detecting ultrasound echoes reflected at a multiplicity of sample volumes in said scan plane;

acquiring raw acoustic sample data derived from ultrasound echoes reflected from said scan plane;

storing an image frame data set of raw acoustic sample data for said scan plane;

organizing said raw acoustic sample data of said image frame data set into a histogram data set;

determining a first end point of a map input range as a function of said histogram data set;

determining a second end point of said map input range as a function of said histogram data set;

constructing a gray-scale map comprising output values corresponding to respective input values of said map input range;

applying said gray-scale map to an image frame data set to form a gray-scale mapped image frame data set; and displaying said gray-scale mapped image frame data set.

21. An imaging system comprising:

a transducer array comprising a multiplicity of transducer elements;

acquisition means coupled to said transducer array for acquiring an image frame data set of raw acoustic data samples during each scan;

memory for storing a respective image frame data set of raw acoustic data samples for each scan;

a display subsystem for displaying an image frame data set; and a data processor programmed to perform the following steps:

(a) organizing at least one of said image frame data sets retrieved from said memory into a histogram data set;

(b) determining first and second end points of a map input range as a function of said histogram data set;

(c) constructing a gray-scale map comprising output gray-scale values corresponding to respective input values of said map input range;

(d) applying said gray-scale map to an image frame data set retrieved from said memory to form a gray-scale mapped image frame data set; and (e) sending said gray-scale mapped image frame data set to said display subsystem for display.

22. The system as defined in claim 21, wherein said step of determining end points comprises the steps of counting the lowest raw acoustic sample data values in said histogram data set until a predetermined percentage is attained and determining a next highest acoustic sample data value not included in said predetermined percentage, said next highest acoustic sample data value being adopted as said first end point of said new map input range.

23. The system as defined in claim 21, wherein said step of determining end points comprises the steps of counting the highest raw acoustic sample data values in said histogram data set until a predetermined percentage is attained and determining a next lowest acoustic sample data value not included in said predetermined percentage, said next lowest acoustic sample data value being adopted as said second end point of said new map input range.

24. The system as defined in claim 21, wherein said step of determining end points comprises the steps of determining maximum and minimum acoustic sample data values in said histogram data set.

25. The system as defined in claim 21, wherein said data processor is further programmed to perform the steps of:

comparing a slope of said gray-scale map with a predetermined slope limit; and manipulating at least one of said first and second end points to form a reconstructed gray-scale map in response to said slope limit being exceeded.

26. An imaging system comprising:

a transducer array comprising a multiplicity of transducer elements;

acquisition means coupled to said transducer array for acquiring an image frame data set of raw acoustic data samples during each scan;

memory for storing a respective image frame data set of raw acoustic data samples for each scan and for storing an old map having output values corresponding to respective input values of an old map input range;

a display subsystem for displaying an image frame data set; and a data processor programmed to perform the following steps:
  (a) organizing at least one of said image frame data sets retrieved from said memory into a histogram data set;
  (b) determining first and second end points of a new map input range as a function of said histogram data set;
  (c) transforming said old map into a new map comprising output values corresponding to respective input values of said new map input range, said output values of said new map being derived from said output values of said old map;
  (d) applying said new map to an image frame data set to form a mapped image frame data set; and
  (e) sending said gray-scale mapped image frame data set to said display subsystem for display.

* * * * *